Patented Aug. 19, 1952

2,607,799

UNITED STATES PATENT OFFICE 2,607,799

PROCESS FOR THE PREPARATION OF GLYCOL ESTERS OF BENZYL ACID PHTHALATE

William E. Weesner, Webster Groves, Mo., assignor to Monsanto Chemical Company, St. Louis, Mo., a corporation of Delaware No Drawing. Application September 22, 1949, Serial No. 117,280

4 Claims. (Cl. 260—475)

This invention relates to glycol esters of benzyl acid phthalate having the formula

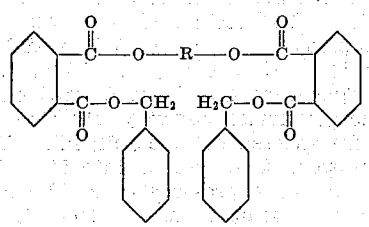

wherein R represents an alkylene radical containing at least 2 and not more than 12 carbon atoms. Hereinafter the expression glycol esters of benzyl acid phthalate is meant to include only those esters as defined by the above-mentioned formula.

The novel glycol esters of benzyl acid phthalate of this invention are clear, essentially colorless liquids having a wide range of viscosities dependent upon the particular glycol utilized. These have been found to have exceptional utility as plasticizers and extenders for various natural and synthetic resins, and in particular polyvinyl chloride resin and copolymers containing predominantly combined vinyl chloride as exemplified by copolymers containing 85–95% by weight of vinyl chloride and 15–5% by weight of vinyl acetate, vinylidine chloride, dimethyl maleate, dimethyl fumarate or methyl methacrylate.

Various procedures may be utilized in preparing the novel compounds of this invention. Preferably, however, they are prepared by reacting 1 molecular proportion of an aliphatic glycol containing at least 2 and not more than 12 carbon atoms, with approximately 2 molecular proportions of phthalic anhydride at a temperature in the range of from about 100°–150° C., thereby forming a reaction mixture containing predominantly glycol bis(acid phthalate). To this reaction mixture is then added approximately 2 molecular proportions of benzyl chloride and approximately a 1 molecular proportion of an alkali metal carbonate, preferably potassium carbonate, and the reaction mixture heated to a temperature in the range of from about 100°–160° C., within which range it is held with continuous agitation until the reaction is complete, thereby forming a reaction mixture containing predominantly the glycol esters of benzyl acid phthalate. The ester thus obtained may be purified according to any of the convenient methods well known to those skilled in the art. For example, the crude ester may be washed with water and a dilute alkaline solution, steamed to remove low boiling material, and dried under reduced pressure at an elevated temperature.

The following examples are illustrative of the manner of preparation of the novel esters of this invention and their physical properties:

EXAMPLE I

*Ethylene glycol bis(benzyl phthalate)*

In a glass reactor equipped with a stirrer, thermometer, and water cooled return condenser, 222 g. of phthalic anhydride and 46.6 g. of ethylene glycol were heated with continuous agitation for a period of about 2 hours at a temperature of about 125° C. To this reaction product was added 189.8 g. of benzyl chloride, and then over a period of about 1½ hours, 106.6 g. of potassium carbonate (96.3% assay) was added at 85–95° C. Following the addition of potassium carbonate, the reaction mixture was heated with stirring at 140°–160° C. for about 5 hours. The reaction mixture was then washed with water and a dilute solution of sodium carbonate, steamed to remove low boiling material, washed again with a sodium carbonate solution, and then dried under reduced pressure at a temperature of about 110° C. An excellent yield of ethylene glycol bis(benzyl phthalate) was obtained having the following properties:

| | |
|---|---|
| $N_D^{25°}$ | 1.5754 |
| Sp. Gr. 25°/25° | 1.2333 |
| Flash point °F | 500 |
| Fire point, °F | 570 |
| Viscosity, poises at 25° C. (approx.) | 46.3–63.4 |

EXAMPLE II

*1,6-hexanediol bis(benzyl phthalate)*

1,6-hexanediol bis(benzyl phthalate) was prepared utilizing the following reactants under the same conditions as set forth in Example I:

148.0 g. phthalic anhydride
59.0 g. 1,6-hexanediol
69.2 g. potassium carbonate (99.9%)
126.5 g. benzyl chloride Utilizing the above reactants, 182.1 g. of 1,6- hexanediol bis(benzyl phthalate) was obtained having the following properties:

| | |
|---|---|
| $N_D^{25°}$ | 1.5579 |
| Sp. gr. 25°/25° | 1.1715 |
| Flash point, °F | 525 |
| Fire point, °F | 570 |
| Viscosity, poises at 25° C. (approx.) | 12.5 |

EXAMPLE III

*1,3-octanediol bis(benzyl phthalate)*

1,3-octanediol bis(benzyl phthalate) was prepared utilizing the following reactants under the same conditions as set forth in Example I:

148.0 g. phthalic anhydride
63.0 g. 1,3-octanediol
69.2 g. potassium carbonate (99%)
126.5 g. benzyl chloride Utilizing the above reactants, an excellent yield of 1,3-octanediol bis(benzyl phthalate) was obtained having the following properties:

| | |
|---|---|
| $N_D^{25°}$ | 1.5459 |
| Sp. gr. 25°/25° | 1.1411 |
| Flash point, °F | 390 |
| Fire point, °F | 510 |
| Viscosity, poises at 25° C. (approx.) | 40 |
| Assay per cent | 90 |

EXAMPLE IV

*1,3-butanediol bis(benzyl phthalate)*

1,3-butanediol bis(benzyl phthalate) was prepared utilizing the following reactants under the same conditions as set forth in Example I:

148.0 g. phthalic anhydride
45.1 g. 1,3-butanediol
126.5 g. benzyl chloride
69.2 g. potassium carbonate

EXAMPLE V

*2-butyl-1,3-octanediol bis(benzyl phthalate)*

2-butyl-1,3-octanediol bis(benzyl phthalate) was prepared utilizing the following reactants under the same conditions as set forth in Example I:

74.0 g. phthalic anhydride
50.5 g. 2-butyl-1,3-octanediol
34.6 g. potassium carbonate
63.3 g. benzyl chloride Additional examples of the novel esters of this invention are the 2-methyl-2,4-pentanediol bis(benzyl phthalate), 2-ethyl-1,3-hexanediol bis(benzyl phthalate), 2,5-hexanediol bis(benzyl phthalate), 1,2-propanediol bis(benzyl phthalate), 1,4-butanediol bis(benzyl phthalate), 1,10-decanediol bis(benzyl phthalate), 2,4-pentanediol bis(benzyl phthalate), 1,6-hexanediol bis(benzyl phthalate) and 1,8-octanediol bis(benzyl phthalate).

The novel compounds of this invention possess outstanding utility as non-fugitive plasticizers for polyvinyl chloride resins. In many applications utilizing plasticized polyvinyl chloride compositions it is desirable that the plasticizer content of the plasticized composition be retained in the composition for exceptionally long periods of time under various conditions. For example, such plasticizers should possess low volatility and non-migratory properties, i. e., little or no tendency to leave the plasticized polyvinyl chloride composition and enter or attack another material, for example, a synthetic resin surface which may come in contact with the plasticized polyvinyl chloride composition. Heretofore in such applications resinous type plasticizers have been utilized almost exclusively, possessing these desirable characteristics of low volatility and non-migratory tendencies. As a general rule, the ester type plasticizers have not been found to be satisfactory in these respects. Resinous type plasticizers, however, are deficient in several respects. They are exceptionally difficult to process or prepare and are generally highly colored. Surprisingly, the novel compounds of this invention have been found to possess the advantageous characteristics of resinous non-migratory plasticizers heretofore used while avoiding the disadvantages thereof thereby permitting the preparation of exceptionally permanent resinous compositions plasticized with easily prepared ester type plasticizers.

Such characteristics are illustrated by the properties of plasticized polyvinyl chloride compositions containing the novel esters of this invention.

Compositions were prepared containing 100 parts by weight of a polyvinyl chloride resin formed by the polymerization of vinyl chloride and 50 parts by weight of the novel esters of this invention. The resin and plasticizer were intimately mixed and fluxed on a differential steel roll mill for 5 minutes at 160° C. When homogeneous compositions had been formed on the roll mill, the plasticized polyvinyl chloride compositions were sheeted off the roll mill. These compositions were then molded into 5" x 5" x .040" sheets under a pressure of 2,000 lbs. per square inch at a temperature of 160° C. The compositions were clear, substantially colorless, free from odor and leathery in hand. They were flexible at room temperature, and at reduced temperatures. The non-fugitive nature of the novel esters of this invention as plasticizers for polyvinyl chloride compositions was indicated by the outstanding degree of retention of the plasticizer when the plasticized composition was subjected to elevated temperatures for extended periods of time. Thus, these compositions retained substantially 99% of their plasticizer content after being placed in a Freas circulating oven at 105° C. for a period of 24 hours. The non-migratory characteristics of the novel compounds of this invention when utilized as plasticizers for polyvinyl chloride resins, was demonstrated by placing these compositions in contact with a plasticized cellulose nitrate film at a temperature of 50° C. under a pressure of 0.5 lb. per square inch for a period of 3 days. After such a period of time in contact with the cellulose nitrate surface, the samples were removed and the cellulose nitrate surface examined. The cellulose nitrate surface in contact with the polyvinyl chloride compositions plasticized with the novel compounds of this invention was marred only to the extent of being marked, which was due more to pure physical contact between the two surfaces rather than an actual migration of the plasticizer. Polyvinyl chloride compositions containing the simple esters heretofore used as plasticizers for polyvinyl chloride, under a similar migration test severely softened the cellulose nitrate surface indicating a considerable degree of migration of the ester type plasticizer from the polyvinyl chloride composition to the cellulose nitrate film. The above described results of the permanence and migration tests of compositions containing the novel compounds of this invention as plasticizers, clearly demonstrate that these compounds are an extremely permanent, non-migratory or non-fugitive type of plasticizer

What is claimed is:

1. A process for the preparation of glycol esters of benzyl acid phthalate having the formula:

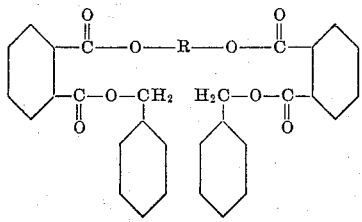

wherein R represents an alkylene radical containing at least 2 and not more than 12 carbon atoms, which comprises reacting a 1 molecular proportion of an aliphatic glycol containing at least 2 and not more than 12 carbon atoms, with approximately 2 molecular proportions of phthalic anhydride at a temperature in the range of from about 100°–150° C. thereby forming a reaction mixture containing predominantly a glycol bis(acid phthalate), reacting the glycol bis(acid phthalate) therein with a mixture containing approximately 2 molecular proportions of benzyl chloride and approximately a 1 molecular proportion of an alkali metal carbonate, while maintaining a temperature in the range of from about 100°–160° C., and recovering therefrom said glycol ester of benzyl acid phthalate.

2. A process as described in claim 1 wherein the aliphatic glycol is ethylene glycol.

3. A process as described in claim 1 wherein the aliphatic glycol is 1,6-hexanediol.

4. A process as described in claim 1 wherein the aliphatic glycol is 1,3-octanediol.

WILLIAM E. WEESNER.

REFERENCES CITED

The following references are of record in the file of this patent:

UNITED STATES PATENTS

| Number | Name | Date |
|---|---|---|
| 2,075,107 | Frazier | Mar. 30, 1937 |
| 2,293,775 | Soday | Aug. 25, 1942 |